(12) United States Patent
Baska et al.

(10) Patent No.: US 7,516,293 B2
(45) Date of Patent: Apr. 7, 2009

(54) INCREASED PERFORMANCE USING MIXED MEMORY TYPES

(75) Inventors: Douglas A. Baska, Pine Island, MN (US); Gerald J. Fahr, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 11/530,341

(22) Filed: Sep. 8, 2006

(65) Prior Publication Data

US 2008/0065786 A1    Mar. 13, 2008

(51) Int. Cl.
*G06F 12/00* (2006.01)

(52) U.S. Cl. ...................................... 711/170

(58) Field of Classification Search .................. None
See application file for complete search history.

(56) References Cited

U.S. PATENT DOCUMENTS

| | | | |
|---|---|---|---|
| 4,958,273 A | 9/1990 | Anderson et al. | |
| 5,319,591 A | 6/1994 | Takeda et al. | |
| 5,418,921 A | 5/1995 | Cortney et al. | |
| 5,537,598 A | 7/1996 | Kukula et al. | |
| 5,771,367 A | 6/1998 | Beardsley et al. | |
| 7,161,834 B2 * | 1/2007 | Kumahara et al. | 365/185.18 |
| 2004/0133758 A1 * | 7/2004 | Matsuda | 711/167 |
| 2007/0288683 A1 * | 12/2007 | Panabaker et al. | 711/101 |

\* cited by examiner

*Primary Examiner*—Hiep T Nguyen
(74) *Attorney, Agent, or Firm*—Cantor Colburn LLP; Lily Neff

(57) ABSTRACT

A memory unit includes a system memory controller coupled to a plurality of memory clock oscillators and a plurality of respective voltage controllers, wherein each memory clock oscillator and respective voltage controller are coupled to a memory receptacle and thus provide a plurality of memory receptacles, each receptacle in the plurality of receptacles having a separate power boundary for operation of a memory type. The memory unit provides a computing system with capabilities to operate a variety of memory types. Methods and computer program products of operation of the memory unit are provided.

18 Claims, 2 Drawing Sheets

INCREASED PERFORMANCE USING MIXED MEMORY TYPES

BACKGROUND OF THE INVENTION

1. Field of the Invention

The present disclosure relates generally to incorporation of memory modules into a computing system, and more particularly to use of varied types of memory modules within a single system.

2. Description of the Related Art

In any system using memory modules to store data, design of hardware for the system dictates the type of memory module which can be used. This is usually a result of limitations related to a power supply and a clock frequency needed for operating the chosen type memory module type. Unfortunately, such designs can be very limiting.

For example, one only need refer to commercial catalogs offering memory modules to realize that an abundance of designs is available. In frequent instances, it can be difficult to find a desired type of memory module for a computing system.

What are needed are techniques for using a variety of types of memory modules within any one computing infrastructure. Preferably, the techniques provide for commingling of memory modules having a variety of performance characteristics.

BRIEF SUMMARY OF THE INVENTION

Disclosed is a memory unit including a system memory controller coupled to a plurality of memory clock oscillators and a plurality of respective voltage controllers, wherein each memory clock oscillator and respective voltage controller are coupled to a memory receptacle and thus provide a plurality of memory receptacles, each receptacle in the plurality of receptacles having a separate power boundary for operation of a memory type.

Also disclosed is a method for providing a computing infrastructure with memory, the method including: coupling a memory unit to the infrastructure, the memory unit including a system memory controller coupled to a plurality of memory clock oscillators and a plurality of respective voltage controllers, wherein each memory clock oscillator and respective voltage controller are coupled to a memory receptacle and thus provide a plurality of memory receptacles, each receptacle in the plurality of receptacles having a separate power boundary for operation of a memory type; electing at least two memory types for installation into the memory unit; installing the memory types into the memory unit.

Further disclosed is a computing system including: a memory unit including a system memory controller coupled to a plurality of memory clock oscillators and a plurality of respective voltage controllers, wherein each memory clock oscillator and respective voltage controller are coupled to a memory receptacle and thus provide a plurality of memory receptacles, each receptacle in the plurality of receptacles having a separate power boundary for operation of a memory type.

Additionally, a computer program product including machine readable code stored on machine readable media, is disclosed and includes instructions for: interrogating a memory type installed in a memory unit including a system memory controller coupled to a plurality of memory clock oscillators and a plurality of respective voltage controllers, wherein each memory clock oscillator and respective voltage controller are coupled to a memory receptacle and thus provide a plurality of memory receptacles, each receptacle in the plurality of receptacles having a separate power boundary for operation of the memory type; determining the memory type; and setting at least one operational parameter of the power boundary for the memory type.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
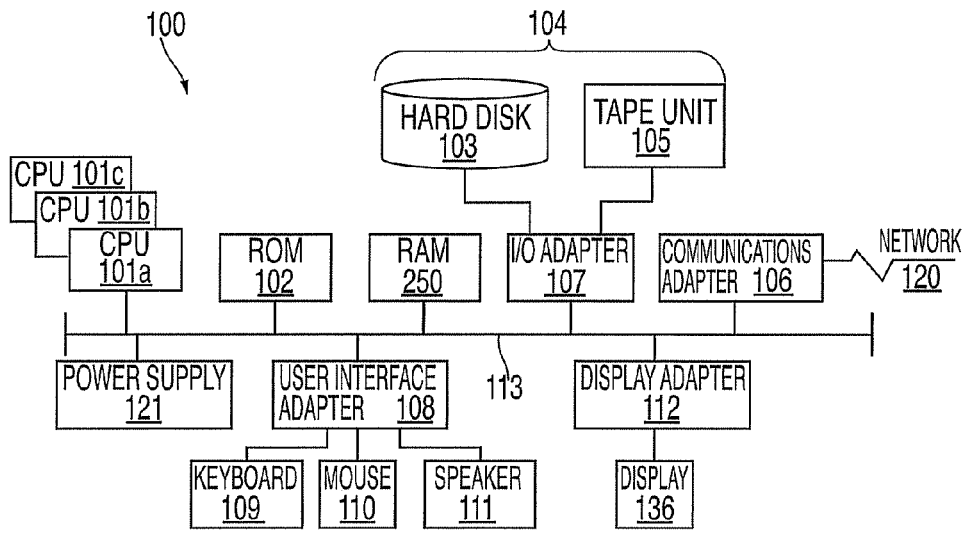
FIG. 1 illustrates aspects of a computing infrastructure.

Referring now to FIG. 1, an exemplary embodiment of a computing system 100 according to the present invention is depicted. In this example, the system 100 has one or more central processing units (processors) 101a, 101b, 101c, etc. (collectively or generically referred to as processor(s) 101). In one embodiment, certain ones of the processor 101 include a reduced instruction set computer (RISC) microprocessor. Processors 101 are coupled to a memory unit 250 and various other components via a system bus 113. Read only memory (ROM) 102 is coupled to the system bus 113 and may include a basic input/output system (BIOS), which controls certain basic functions of system 100. The system 100 is powered by a power supply 121. The power supply 121 includes transformers and other devices as needed for providing appropriate power signals at desired frequencies.

FIG. 1 further depicts an I/O adapter 107 and a network communications adapter 106 coupled to the system bus 113. I/O adapter 107 may be a small computer system interface (SCSI) adapter that communicates with a hard disk 103, a tape storage drive 105 or any other similar component. I/O adapter 107, hard disk 103, and tape storage device 105 are collectively referred to herein as mass storage 104. A network adapter 106 interconnects bus 113 with an outside network 120 enabling data processing system 100 to communicate with other such systems. Display monitor 136 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI) bus. Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

As is known in the art, an application is typically stored on the mass storage 104 and includes machine executable instructions for performing a task. In this embodiment, each application may be associated with a processor, a portion of the memory 250 or arranged as needed by an operating system.

Thus, as configured FIG. 1, the system 100 includes processing means in the form of processors 101, storage means including memory unit 250 and mass storage 104, input means such as keyboard 109 and mouse 110, and output means including speaker 111 and display 136. In one embodiment, a portion of system memory 250 and mass storage 104 collectively store an operating system such as the AIX® operating system from IBM Corporation to coordinate the functions of the various components shown in FIG. 1.

As provided for herein, the memory unit 250 includes further components. The further components provide for the use of a variety of types of memory modules. The memory modules include, for example, various types of RAM, DRAM, SDRAM, DIMM including FBDIMM, MiniDIMM, RDIMM, SODIMM, UDIMM, VLP DIMM, VLP MiniDIMM, including memory making use of DDR, DDR2 and DDR3 and other technologies and physical designs. As the design of memory units is constantly changing, one skilled in the art will recognize that this listing in not exhaustive. merely illustrative and therefore not limiting of types of memory modules that may be included for use in the system 100. An exemplary memory unit 250 is provided in FIG. 2.

Figure 2:
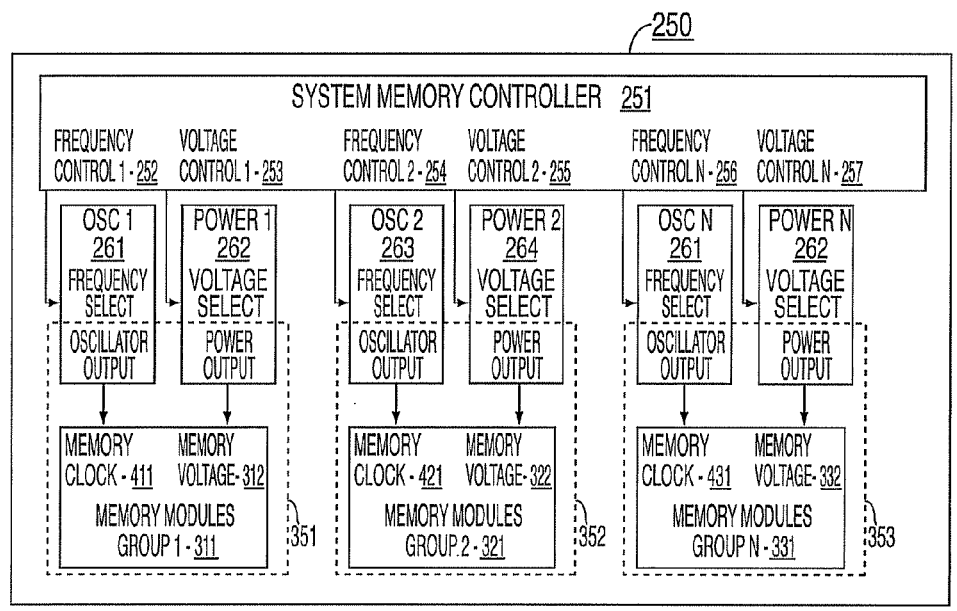
FIG. 2 depicts one embodiment of system memory controls for using mixed memory types.

Referring to FIG. 2, the exemplary memory unit 250 includes a system memory controller 251. The memory controller 251 provides for control and arbitration over the various forms of memory modules used within the system 100. In this embodiment, the memory controller 251 includes a plurality of frequency controllers and voltage controllers. For example, the memory controller 251 includes a first frequency controller 252 with a corresponding first voltage controller 253, a second frequency controller 254 with a corresponding second voltage controller 255, and so on, up to a $N^{th}$ frequency controller 256 with a corresponding $N^{th}$ voltage controller 257, where N correlates to a number of types of memory modules installed in the system 100.

Each frequency controller 252, 254, 256 provides input to a respective selectable memory clock oscillator (where a first selectable memory clock oscillator 261, a second selectable memory clock oscillator 263 and a $N^{th}$ selectable memory clock oscillator 265 are depicted). The input includes information for frequency selection and oscillator output. Output from each selectable memory clock oscillator 261, 263, 265 provides for a respective memory clock (a first memory clock 411, a second memory clock 421 and an $N^{th}$ memory clock 431). Thus, a memory clock is provided for each group of memory modules.

Similarly, each voltage controller 253, 255, 257 provides input to a respective memory power supply. For example, the first voltage controller 253 provides input to a first memory power supply 262 (note a second memory power supply 264 and an $N^{th}$ memory power supply 266 are depicted). The input includes information for selecting operational voltage and providing power output as a respective memory voltage (as depicted, this includes a first memory voltage 312, a second memory voltage 322 and an $N^{th}$ memory voltage 332). Thus, a memory voltage 312, 322, 332 is provided for each group of memory modules.

As depicted, the memory unit 250 includes a plurality of memory modules. The memory modules are shown in FIG. 2 as being included in groups. More specifically, FIG. 2 depicts a first group of memory modules 311, a second group of memory modules 321 and an $N^{th}$ group of memory modules 331. A user may include as many groups of memory modules as desired and provided for by system designers and manufacturers. In some embodiments, additional memory units 250 may be added as needed, thus enhancing and extending the availability of memory capacity.

Although not shown in greater detail herein, one skilled in the art will recognize that each group of memory modules 311, 321, 331 provides memory output. The memory output is typically transformed, as needed, to the voltage and frequency of the bus 113 by the system memory controller 251, or other components as are known in the art.

One skilled in the art will recognize that a variety of benefits may be realized by having a system 100 that provides for using mixed memory types. For example, the teachings herein provide for enhancing system performance as needed by having workloads running in partitions. Flexible configuration options are provided. Overall system memory costs are reduced by only using the most expensive memory devices, typically leading edge capacity or high frequency devices, in a subset of the total system memory. For example, in some embodiments, quality factors are assigned to each memory group (in one embodiment, the assigning occurs in the background of the operating system). High quality memory is partitioned and reserved for applications which demand the quality. In this embodiment, remaining system memory is populated with less costly, slower speed modules for the less demanding applications.

However, in prior art systems, the advantages of using mixed memory types is prevented as all memory modules are electrically connected to the same power boundary and memory clock oscillator.

By creating separate power boundaries for different groups of memory modules and by creating selectable memory clock oscillator frequencies for each of the groups, the system 100 is designed for strategic selection of mixed types of memory module. Since each group of memory modules can be powered by a selectable voltage level and also have a selectable clock frequency value, there is enormous flexibility for populating different types of memory modules. This flexibility allows the system 100 to be tailored to allow the best performance for the least amount of cost.

The memory unit 250 according to the teachings herein provides for a separate power boundary and memory clock oscillator input for each group of memory modules. In typical embodiments, the voltage level and the memory clock oscillator frequency for each power boundary 351, 352, 353 are selectable. Preferably, each power boundary 351, 352, 353 provides a design for accommodating a maximum capacity and speed to be used.

In some embodiments, the system memory controller 251 sets the voltage level and memory clock frequency for each power boundary 351, 352, 353. Setting the operational parameters may involve use of any one of the processors 101, an operating system, a user command and other components. One technique for having the system memory controller 251 set the voltage level and memory clock frequency for each power boundary 351, 352, 353 involves interrogating a selected group of memory modules 311, 321, 331 with a signal and resolving a returned signal to determine operational characteristics.

In other embodiments, the system memory controller 251 provides for obtaining operational parameters for each group of memory modules 311, 321, 331 and providing that information to a user for manual customization. In further embodiments, the system 100 provides correlation between certain processors 101 and groups of memory modules 311, 321, 331.

In further embodiments, one or none of the memory clock frequency and voltage level are selectable for a given group of memory modules. In some of these embodiments, the system memory controller 251 determines operational aspects of the respective power boundary according to a physical address.

Figure 3:
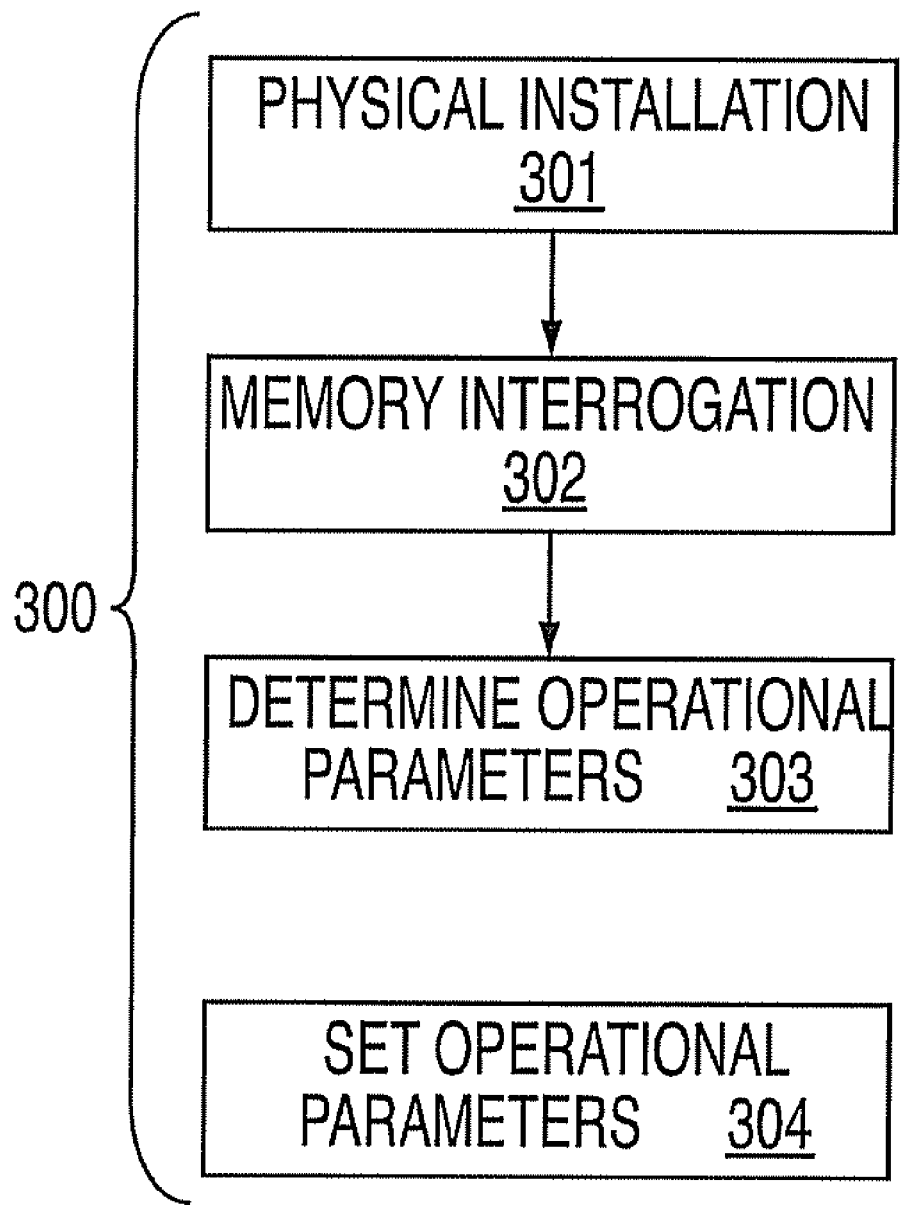
FIG. 3 depicts a method for installing mixed memory types into the computing infrastructure.

An exemplary method for adding memory modules is provided in FIG. 3. In FIG. 3 adding memory 300 includes a first step 301 of physical installation. Physical installation 301 typically requires a user insert memory modules into a module receptacle (not shown). In a second step 302, the system 100 interrogates the memory modules. In a third step 303, the system 100 determines operational characteristics for the memory modules (according to, for example, a look-up table, a returned signal or an algorithm). In a fourth step 304 and once the operational characteristics are determined, the system 100 sets at least one of the frequency and voltage for the power boundary.

In some embodiments, including a computer program product, the computer program senses the type of memory for setting of the voltage level and the memory clock frequency. In some of these embodiments, the sensing is "hard wired," such as by a means on a pluggable memory card of a given memory type. The hard wired means provides a signal to a respective power supply (or controller thereof) to provide a predetermined voltage level. Typically, the voltage levels available would be governed by design of the power supply and the number of sensing lines dedicated for this function.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at east one of the referenced item.

What is claimed is:

1. A memory unit comprising:
  a system memory controller coupled to a plurality of memory clock oscillators and a plurality of respective voltage controllers, wherein each memory clock oscillator and respective voltage controller are coupled to a memory receptacle and thus provide a plurality of memory receptacles, each receptacle in the plurality of receptacles having a separate power boundary for operation of a memory type.

2. The memory unit as in claim 1, wherein the plurality of receptacles comprises adapters for receiving a plurality of memory types.

3. The memory unit as in claim 2, wherein the memory type comprises at least one of RAM, DRAM, SDRAM, DIMM, FBDIMM, MiniDIMM, RDIMM, SODIMM, UDIMM, VLP DIMM, VLP MiniDIMM, DDR, DDR2 and DDR3.

4. The memory unit as in claim 1, wherein the system controller provides a setting for at least one memory clock oscillator and at least one voltage controller.

5. The memory unit as in claim 4, wherein the system controller provides the setting by receiving at least one of a manual input and an input from an operating system.

6. A method for providing a computing infrastructure with memory, the method comprising:
  coupling a memory unit to the infrastructure, the memory unit comprising a system memory controller coupled to a plurality of memory clock oscillators and a plurality of respective voltage controllers, wherein each memory clock oscillator and respective voltage controller are coupled to a memory receptacle and thus provide a plurality of memory receptacles, each receptacle in the plurality of receptacles having a separate power boundary for operation of a memory type;
  selecting at least two memory types for installation into the memory unit;
  installing the memory types into the memory unit.

7. The method as in claim 6, further comprising manually setting an operating voltage for at least one of the memory types.

8. The method as in claim 6, further comprising manually setting an operating frequency for at least one of the memory types.

9. The method as in claim 6, further comprising reserving at least one of the memory types for an application.

10. The method as in claim 6, wherein installing comprises installing a first one of the memory types into a first power boundary and installing a second one of the memory types into another power boundary.

11. A computing system comprising:
  a memory unit comprising a system memory controller coupled to a plurality of memory clock oscillators and a plurality of respective voltage controllers, wherein each memory clock oscillator and respective voltage controller are coupled to a memory receptacle and thus provide a plurality of memory receptacles, each receptacle in the plurality of receptacles having a separate power boundary for operation of a memory type.

12. The computing system as in claim 11, wherein a power boundary is associated with a processor.

13. The computing system as in claim 11, wherein a power boundary is associated with an application.

14. A computer program product comprising machine readable code stored on machine readable media, the product comprising instructions for:

interrogating a memory type installed in a memory unit comprising a system memory controller coupled to a plurality of memory clock oscillators and a plurality of respective voltage controllers, wherein each memory clock oscillator and respective voltage controller are coupled to a memory receptacle and thus provide a plurality of memory receptacles, each receptacle in the plurality of receptacles having a separate power boundary for operation of the memory type;

determining the memory type; and setting at least one operational parameter of the power boundary for the memory type.

15. The computer program product as in claim 14, wherein the setting comprises setting a memory clock frequency.

16. The computer program product as in claim 14, wherein the setting comprises setting a voltage level.

17. The computer program product as in claim 14, wherein the memory type provides a signal for setting a voltage level.

18. The computer program product as in claim 14, wherein the memory type provides a signal for setting a memory clock frequency.

\* \* \* \* \*